Jan. 15, 1935.  R. E. TISCH  1,988,403
ILLUMINATED DIRECTION INDICATOR
Filed Jan. 20, 1933
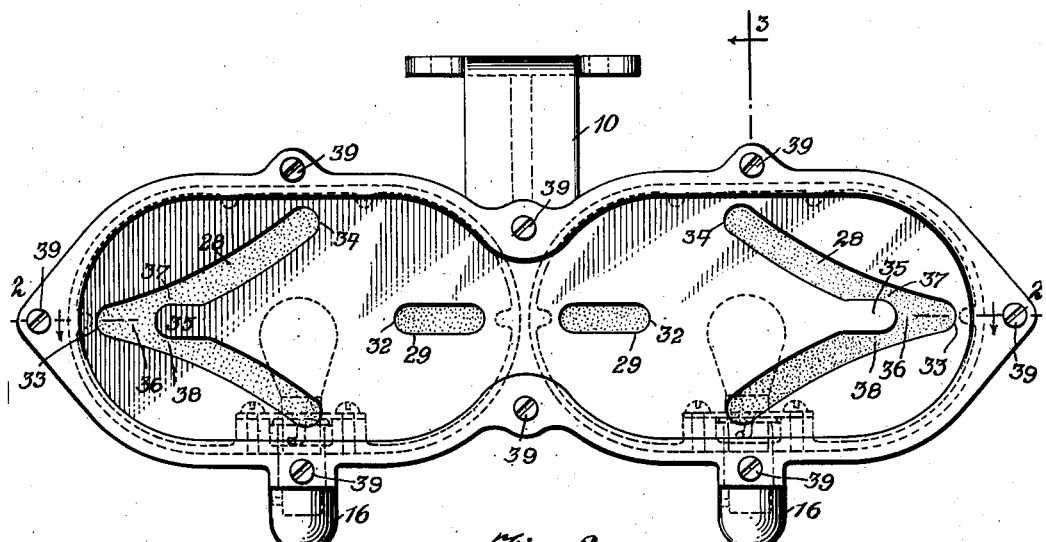
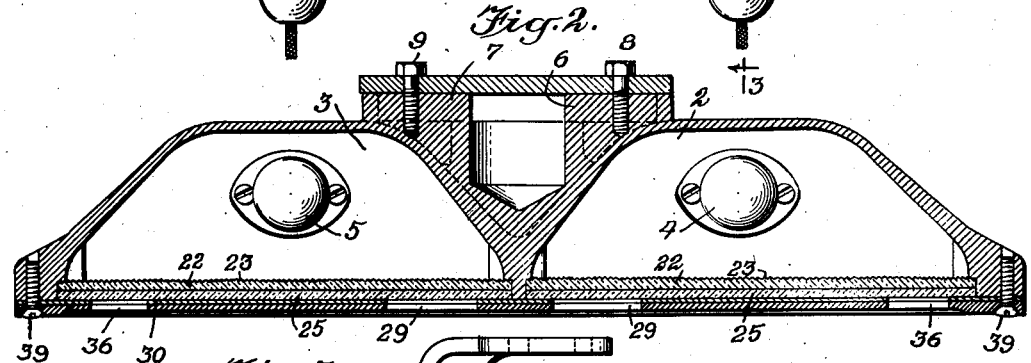
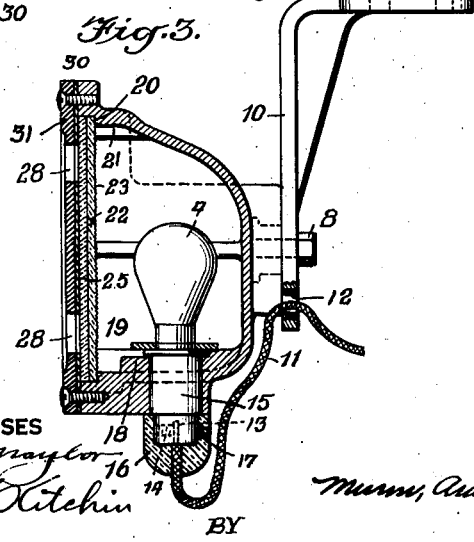
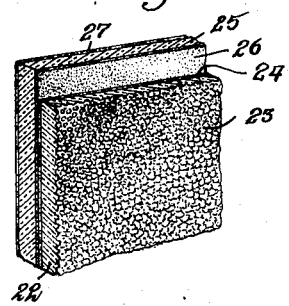
INVENTOR
Raymond E. Tisch
ATTORNEYS Patented Jan. 15, 1935

1,988,403

UNITED STATES PATENT OFFICE 1,988,403

ILLUMINATED DIRECTION INDICATOR

Raymond E. Tisch, Hillside, Elizabeth, N. J.

Application January 20, 1933, Serial No. 652,707

1 Claim. (Cl. 177—329)

This invention relates to illuminated direction indicators and has for an object to provide an improved construction wherein the indicator may be readily seen at an appreciable distance by day and night.

Another object of the invention is to provide an illuminated direction indicator designed to be controlled from the steering wheel or instrument board of a truck or other automotive vehicle, and to indicate by means of an arrow, hand or other directing member at either the front or rear, or both at the front and rear, of the vehicle in such a manner as to be readily visible at an appreciable distance both in the day time and also at night.

A further object of the invention is to provide an illuminated direction indicator for vehicles wherein an illuminated arrow or other indicating means is provided and illuminated in such a manner as to give the desired signal without glare.

A further object of the invention is to provide in an illuminated direction indicator a construction which is water and dust proof, and wherein the lamp and other fragile parts are protected by a casing of metal.

In the accompanying drawing—

Figure 1 is a front view of an illuminated direction indicator disclosing an embodiment of the invention;

Figure 2 is a sectional view through Figure 1 on the line 2—2;

Figure 3 is a sectional view through Figure 1 on the line 3—3;

Figure 4 is an enlarged fragmentary perspective view of the various diffusion members shown in Figures 2 and 3.

Referring to the accompanying drawing by numerals, 1 indicates a housing having two chambers or compartments 2 and 3 to accommodate the respective lamps or bulbs 4 and 5. The housing 1 is preferably cast from aluminum, though it could be made from other metal. During the casting enlargements or lugs 6 and 7 are provided, said lugs having threaded apertures for receiving the cap screws 8 and 9, which cap screws may be used to clamp an angle bracket 10 in place, which bracket is clamped to some part of the vehicle when the device is in use.

If the angle bracket 10 is not necessary, the cap screws 8 and 9 are used to clamp the device directly to some part of the vehicle. It will be understood that the device as shown in the drawing is applied to the front and also to the rear of the vehicle and that the two devices are connected up to function simultaneously. When the bracket 10 is used it acts as a support for the cable 11 which may be an ordinary electric cord or may be a Bx cable. This cable extends through a fiber bushing 12 snugly fitted into an aperture in the bracket 10. It will be seen from Figure 3 that the cable 11 has an end 13 thereof held in place by a suitable clamping screw 14 so as to provide the proper contact. It will also be noted that the socket 15 is any of the usual types of single contact sockets, and the lamps are also the single contact type, namely, the center of the lamp is connected electrically with the end 13 and the outer rim of the lamp is grounded on the housing 1, which ground is connected to one side of the source of supply while the cable 11 is connected to the other side of the source of supply through a suitable switch on the instrument board of the vehicle or on the wheel of the car carrying the device. A fiber cap 16 is fitted over the outer end of the socket 15 and is held in place by the headless screw 17 whereby the parts are maintained water and dust proof.

From Figure 3 it will be noted that the housing 1 is provided with an upwardly extending portion 18 whereby a recess or pocket 19 is formed. In case water should enter by some means the same will run by gravity to the recess 19 and therefore prevent a short circuit of the lamp.

While the lamp may be of any preferred type of single contact, it is preferably one of the bayonet lock style now in common use.

In casting or otherwise forming the housing 1, the same is provided with a shoulder or offset 20 and a number of inwardly extending projections 21 whereby an ample seat is provided for the respective light diffusing plates 22. As the chambers 2 and 3 are identical, and all parts associated therewith are identical, only one will be described, the same being shown in Figures 1, 2 and 3. The glass panel 22 is a commercial style of glass now on the market and consists of a flat panel having small projections or a pebbled surface 23 on one face. However, to adapt the same to the present use the opposite face, as shown in Figure 4, is frosted as at 24. A second diffusing plate 25 coacts with plate 22, said second plate having frosted surfaces 26 and 27. These two plates are in contact, as shown in Figure 3, and act to diffuse the light in such a manner that there will be no glare but ample light will be permitted to pass through these plates, whereby the signal may be seen by day or night for a comparatively long distance, and the signal will be sharp and clear.

As shown in Figure 1, the signal consists of an arrowhead 28 having an elongated member 29 acting as a tail to the head 28. The diffusing plate 22 is preferably amber colored, while the diffusing plate 25 is preferably white. These colors with the frosted parts and the pebbled surface on plate 22 cause the projected light to be of a color readily seen by day or night.

Against the upper face of plate 25 and also the front face of the housing 1 is arranged a gasket 30 which is preferably of cork. This gasket is held in place by a cast metal protecting plate 31 which plate is preferably of aluminum, though it can be made of other material and can be stamped out instead of cast. In the forming of plate 31 openings are made therein in the form of the head 28 and tail 29, as shown in Figure 1. In forming these openings great care must be taken that the opening 29 must have rounded ends 33 in front and a rounded rear end 34. A tongue or projection 35 is also necessary to produce a sharp arrowhead. It will be noted that this tongue projects into the space 36 with the result that the zones 37 and 38 are much narrower than the other parts of the opening, but the opening or space 36 is only slightly longer than the width of the other parts of the opening forming the arrowhead. The metal protecting plate 31 is held in place by suitable flathead screws 39.

From Figures 1 and 2 it will be noted that the glass panels cover the respective compartments 2 and 3, but the gasket 30 and plate 31 extend entirely across the front face of the housing so as to completely cover the same and present an ornamental appearance, as shown in Figure 1. It will be understood that the openings in the gasket are identical with those in the front plate 31 so that when either of the lamps are lit the desired shape of signal device may be seen, namely, an arrowhead with a short tail.

When the device is in use and mounted on a truck, automobile or other vehicle, and is connected up to a storage battery or other source of current, the circuit of the lamps 4 and 5 are provided with switches which may be any desired type, but for convenience a double throw switch has been found desirable, so that when the double throw switch is in a neutral position, both lamps are deprived of current. When the switch is thrown to the right, the circuit of the right hand lamp is closed, and when the switch is thrown to the left the circuit to the left hand lamp is closed. In this way the operator may readily throw the switch in the right direction when he is about to make a turn.

Preferably one indicator is mounted on the front and another on the rear of a truck or other vehicle, and these are connected in multiple so that when a switch is thrown to indicate a right turn, an arrow both at the front and rear, pointing to the right will be illuminated. As soon as the turn has been made or shortly thereafter, the operator merely throws the switch back to a neutral position, whereupon the device is inoperative and remains inoperative.

It will be understood that by reason of the shape of the parts, the arrangement of the lamps and the use of the diffusing plates, the arrow as illustrated in Figure 1 may be readily seen during the day or night, thus permitting the device to be operated at any time to indicate to a following vehicle the intentions of the driver with regard to turning. The plate 31 is preferably painted some dark color, for instance, black or dark blue, so that in the day time the arrows will show up clearly at a comparatively great distance.

I claim:—

An illuminated direction indicator including a housing provided with a compartment, a lamp socket in said compartment, a light diffusing structure arranged in the face of said compartment, and a retaining plate for said compartment having an opening indicating an arrowhead, said opening having a pair of converging outer walls formed with a rounded portion at their point of meeting, an inner wall for each of the first mentioned walls, said last mentioned walls being parallel to the first mentioned walls and merging into a second set of parallel walls whereby a projecting tongue is provided which extends toward the forward end of the arrowhead sufficiently to narrow the opening forming the arrowhead whereby glaring will be eliminated.

RAYMOND E. TISCH.